United States Patent [19]

Kurtz et al.

[11] 4,425,044
[45] Jan. 10, 1984

[54] MIXER HEADS FOR POLYOLEFIN EXTRUDERS

[75] Inventors: Stuart J. Kurtz, Martinsville; Leonard S. Scarola, Union; John C. Miller, Piscataway, all of N.J.

[73] Assignee: Union Carbide Corporation, Danbury, Conn.

[21] Appl. No.: 313,626

[22] Filed: Oct. 21, 1981

[51] Int. Cl.³ .............................................. B29B 1/06
[52] U.S. Cl. ..................................................... 366/79
[58] Field of Search .......................... 366/79, 87, 318; 425/204, 207, 208

[56] References Cited

U.S. PATENT DOCUMENTS

| 2,607,077 | 8/1952 | Dulmage | 366/87 |
| 3,486,192 | 3/1967 | Le Roy | 12/18 |
| 3,730,492 | 5/1973 | Maddock | 366/87 |
| 4,169,679 | 10/1979 | Miller et al. | 366/87 |
| 4,321,229 | 3/1982 | Blakeslee et al. | 366/79 |

OTHER PUBLICATIONS

SPE ANTEC, (1978), pp. 450 et seq., Lai-Fook and Worth, "Rheodynamic Lubrication of Screw Flights to Reduce Air in Single-screw Extruders".
Gonser, H. S., "Elimination of Extruder Screw Galling", *Plastics World*, Oct. 1957.

*Primary Examiner*—Philip R. Coe
*Assistant Examiner*—Thomas W. Epting
*Attorney, Agent, or Firm*—Clement J. Vicari

[57] ABSTRACT

In a single screw extruder mixer head for mixing high viscosity linear polyolefins materials employing a plurality of alternate longitudinal mixing and wiping barriers, the improvement of providing longitudinal radially-stepped regions on the opened bevelled leading edge portions of the outer surface of the wiping barriers to act as hydrodynamic wedges to the passage of polyolefin material passing between the surfaces and the inner walls of the extruder barrel; and radially-stepped opened bevelled leading edge portions of the outer surfaces of the wiping barriers and the outer circumferential surfaces of full diameter of the mixer head supporting an outer coating of gall-resistant material.

4 Claims, 6 Drawing Figures

MIXER HEADS FOR POLYOLEFIN EXTRUDERS

This invention relates of a method for the mixing of linear polyolefin materials having high viscosities, particularly such ethylene polymers and copolymers.

Conventional low density polyethylene has been historically polymerized in heavy walled autoclaves or tubular reactors at pressures as high as 50,000 psi and temperatures up to 300° C. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

With recent developments in low pressure technology, low density narrow molecular weight distribution linear ethylene polymers can now be produced at low pressures and temperatures by copolymerizing ethylene with various alphaolefins. These low pressure LDPE (LP-LDPE) resins generally possess little, if any, long chain branching. They are short chain branched with branch length and frequency controlled by the type and amount of comonomer used during polymerization.

U.S. Patent application Ser. No. 892,325 filed Mar. 3, 1978, and refiled as Ser. No. 14,414 on Feb. 17, 1979, in the names of F. J. Karol et al and entitled preparation of Ethylene Copolymers In Fluid Bed Reactor, and which corresponds to European Patent Application No. 79100953.3 which was published as Publication No. 004,645 on Oct. 17, 1979, discloses that ethylene copolymers, having a density of 0.91 to 0.96, a melt flow ratio of $>22$ to $\leq 32$ and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. patent application Ser. No. 892,322 filed Mar. 31, 1978, and refiled as Ser. No. 12,720 on February 16, 1979, in the names of G. L. Goeke et al. and entitled Impregnated Polymerization Catalyst, Process For Preparing, and Use for Ethylene Copolymerization, and which corresponds to European Patent Application No. 79100958.2 which was published as Publication No. 004,647 on Oct. 17, 1979, discloses that ethylene copolymers, having a density of 0.91 to 0.96, a melt flow ratio of $<22$ to $\leq 32$ and a relatively low residual catalyst content can be produced in granular form, at relatively high productivities, if the monomer(s) are copolymerized in a gas phase process with a specific high-activity Mg-Ti containing complex catalyst which is impregnated in a porous inert carrier material.

U.S. patent application Ser. No. 892,037 filed Mar. 31, 1978, and refiled as Ser. No. 14,412 on February 27, 1979, in the names of B. E. Wagner et al and entitled Polymerization Catalyst, Process For Preparing And Use For Ethylene Homopolymerization, and which corresponds to European Patent Application No. 79100957.4 which was published as Publication No. 004,646 on Oct. 17, 1979, discloses that ethylene homopolymers, having a density of 0.958 to 0.972, a melt flow ratio of $\geq 22$ to $\leq 32$ which have a relatively low residual catalyst residue can be produced at relatively high productivities for commercial purposes by a low pressure gas phase process if the ethylene is homopolymerized in the presence of a high-activity Mg-Ti containing complex catalyst which is blended with an inert carrier material. The granular polymers thus produced are useful for a variety of end-use applications.

The polymers as produced, for example, by the processes of said applications using Mg-Ti containing complex catalyst possess a narrow molecular weight distribution, Mw/Mn, of about $\geq 2.7$ to $\leq 4.1$.

Over the years, film extrusion equipment has been optimized for the rheology of HP-LDPE. The different molecular architecture of low pressure-low density polyethylene (LP-LDPE) results in a film processing behavior which requires different extrusion parameters.

In the present invention, novel apparatus is specifically provided which is addressed to problems encountered with extruder screw mixer heads which are preferably employed as the terminal section of such screws. Such mixer heads are of the high shear type having a plurality of alternate mixing channels and barriers which are formed to separate fluxed thermoplastic material from relatively large particles or chunks of unfluxed thermoplastic material contained in the fluxed matrix.

The close clearance between barriers of the mixer head and the mixer walls of the extruder housing prevent the passage of large particles, while permitting the flow of fluxed thermoplastic material. Apparatus of this type is disclosed and claimed in U.S. Pat. No. 3,486,182 to LeRoy.

It is the general object of this invention to provide improved means for dealing with galling problems encountered in the processing of resins of this type with high shear mixer heads.

The other objects of the invention will be apparent from the following description and appended claims.

In accordance with the present invention, apparatus is provided for the mixing of linear polyolefin materials having high viscosity in a single-screw extruder employing a mixer head having a plurality of alternate longitudinal mixing channels and barriers, said barriers being alternately mixing and wiping barriers, wherein the improvement comprises: longitudinal radially-stepped regions on the opened leading edge portions of the outer surfaces of said wiping barriers to act as hydrodynamic wedges to the passage of polyolefin material passing between said surfaces and the inner walls of the extruder barrel; and both said radially-stepped, opened bevelled, leading edge portions of the outer surfaces of said wiping barriers and the outer circumferential surfaces of full diameter of said mixer head, supporting an outer coating of gall-resistant material.

It has been found that most of the mechanical problems, such as extruder internal surface galling, are relieved by the improvement of gall-resistant coated surfaces on full diameter surfaces of the mixer head and the stepped, bevelled sections. Additionally, it is preferable to provide such gall-resistant coatings to the opened bevelled leading edge portions of the outer surfaces (full diameter). The "gall-resistant coated surface" on the screw flights referred to herein are understood to mean that the alloy coatings which are known to those skilled in the art as improving gall-resistance properties. Examples of such alloys are the nickel-base chromium, silicon, iron, and boron-containing alloys (such as Colmonoy No. 5, 6 or 56) produced by Wall Colmonoy Corporation of Detroit, Mich., U.S.A. and sold for this purpose. Such alloys are normally applied as thin surface coating from either bare or coated rod or crushed powder additions in a gas or electric weld-surfacing operation. One such preferred alloy is Colmonoy No. 56 having a proximate melt analysis of: Cr 12.5%; Fe 4.5%, Si 4.0%, B 2.75%; C 0.70%; and the balance Ni.

Other compositions of gall-resistant materials are as follows:

|    | A (%)   | B (%)   |
|----|---------|---------|
| Cr | 12.5    | 13.5    |
| Fe | 4.25    | 4.75    |
| Si | 3.75    | 4.25    |
| B  | 2.5     | 3.0     |
| C  | 0.65    | 0.75    |
| Ni | Balance | Balance |

Gall-resistant (adhesive wear) and wear-resistant (abrasive wear) studies have shown that many good wear-resistant material compositions are ineffective in imparting any significant gall-resistance.

In the selection of surface coating materials for gall-resistance, it has been noted previously that contacting surfaces of identical or similar compositions afford very poor gall-resistance. While the composition of the surface coatings of the mixing head have been discussed here and above, it is to be noted that the internal bore surface of the extruder barrel should be a dissimilar coating which is capable of reducing adhesive wear commonly referred to as galling. The preferred barrel surface coating is Xalloy 101 (sold by Xalloy, Inc. of New Brunswick, N. J. 08903). This alloy has the following compositions:

| Material    | (%)      |
|-------------|----------|
| CR          | 2–4      |
| Mn          | 2 Man.   |
| Si          | 1.5 Max  |
| B           | 0.5–1.25 |
| C           | 0.1–1.4  |
| Ni          | 2.5–5    |
| Free of CoW |          |
| Fe          | Balance. |

It is also to be noted that the barrel lining material (normally of carbon steel) may also preferably be formed by nitriting of the steel barrel lining.

It should also be noted that such gall-resistant coatings are preferable applied in a substantially symmetrically balanced pattern around the outer circumference of the mixer head.

The primary need in conjunction with the use of the present invention is to prevent wear and/or galling of any potential contact surfaces provided in the rotary interacton between the inner surface of the extruder barrel and the rotary internal mixer head surfaces. This would initially involve all of the full diameter outer surfaces of the mixer head. As normal wear of the mixer head occurs through use, however, other surfaces which were not initially in very close clearance with the extruder barrel come into closer clearance due to wear and the lateral instability of an elongated mixer head supported at the opposite end of the extruder from its mounting at the base of the screw.

As mentioned hereinabove, alternate barriers (or lands) of the mixer head are mixing barriers and wiping barriers. The mixing barriers have a greater clearance to the barrel walls of the mixer and permit the flow of molten material, whereas the wiping barriers have closer clearance to the barrel walls and pass little material.

In accordance with the present invention, the mixer head leading edge portions of the wiping barriers have been provided with open bevels to provide a "hydrodynamic wedge" phenomenon, wherein the incoming fluid flow of the thermoplastic material being treated effects a converging flow pattern caused by a material slider effect in the opened bevelled leading edges of the wiping barriers.

The stepped and bevelled elements of the mixing head which produce the hydrodynamic wedge phenomenon in the thermoplastic material accomplish this by successfully increasing the hydrostatic pressure to reduce the chance of the suspended head from contacting the barrel and thus reducing the above mentioned lateral instability problem.

As employed herein the term hydrodynamic wedge refers to the phenomenon of increased pressure generated by the converging flow of thermoplastic resin across the bevelled configuration of the mixing head described above. The effect of the section of the mixing head is similar to the slider bearing lubrications with converging flow in Newtonian Fluids and results in an increased hydrostatic pressure causing self centering of the mixing head.

Accordingly, it is important that these opened bevelled leading edges also be provided with gall-resistant coating material to reduce galling due to later contact with the barrel surfaces of the extruder.

In summary, it has been found that both the outer circumferential surfaces of full diameter and the opened bevelled leading edge portions of the outer surfaces of the wiping barriers should preferably be coated with a gall-resistant material.

Figure 1:
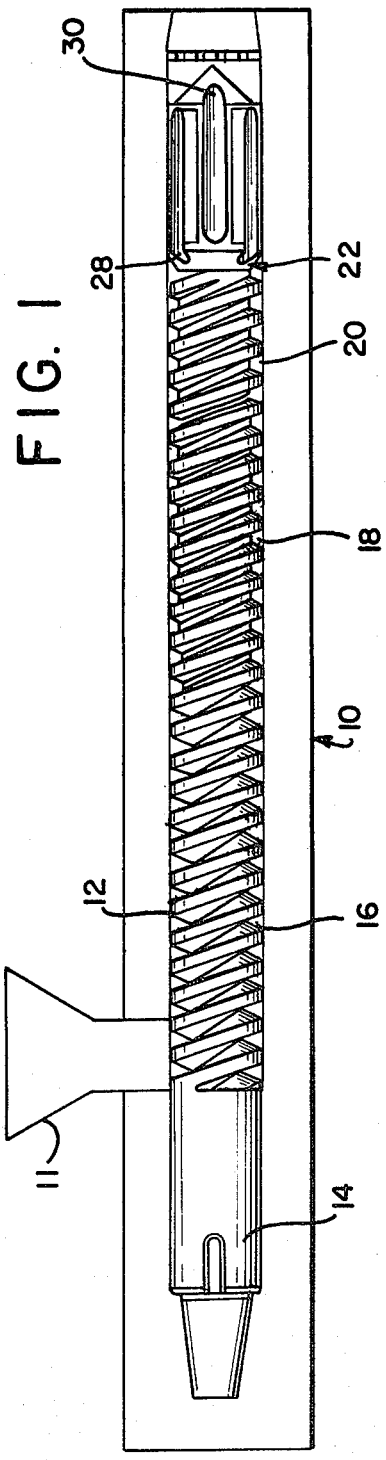
FIG. 1 is a schematic view, partly in elevation and partly in cross-section, of an extruder having a terminal mixer head.

Referring specifically to the FIGS. of the drawings, extruders of the type disclosed in copending U.S. patent application Ser. No. 64,399 filed Aug. 8, 1979 and entitled "A Process for Extruding Ethylene Polymers", (having an extrusion screw with a length-to-diameter ratio of between about 15:1 to 21:1) are provided having extruder housing 10 and a multi-section extruder screw 12 therein having a shank drive portion 14 at the rearward end thereof; a feeding section 16 immediately downstream thereof; a transition section 18 next downstream thereof; a metering section 20 next downstream thereof; and, optionally, a terminal mixing section 22 at the downstream end thereof.

The linear polyolefin material to be extruded is fed in granular form from hopper 11 through the extruder housing 10 near the upstream end of the feeding section 16. The granular material is thus passed through the feeding section having a uniform root depth and is initially compacted and compressed in the feeding section which serves to develop heat within the material and effect the beginnings of melting of the solid material by the time is passed into the transition section.

In the transition section, the screw root depth successively decreases to the screw root depth of the metering section. The transition section has a length of approximately five times the normal screw diameter. Material passing through the section continues to melt, intitially interfaces between already molten polymer and solid compacted granular material, to a point where solid particles break up and small particles of solid polymer become dispersed in the main body of primarily molten polymer material.

The final mechanical working and pumping of the molten polymer is achieved in metering section of the screw from where the primarily polymer melt is passed to the optional final section, the mixing section. The mixing section maybe of the type which is referred to as a "fluted-mixer head" which is disclosed in U.S. Pat. No. 3,486,192 issued Dec. 30, 1969 to G. LeRoy and entitled "Apparatus for Extrusion of Thermoplastics".

Final mixing, homogenization and melting of the polymer material is carried out in the fluted screw mixer section. As the material is broken into a number of streams, each entering a successive inlet fluted mixing channel, it is forced from such channels over intervening barriers into outlet channels which discharge the highly mixed molten material from the fluted mixer section and into the discharge end of the extruder housing.

As employed in the improved apparatus of the present invention, an extruder of the type shown schematically in FIG. 1 is provided having substantially the same apparatus elements described hereinabove with respect to prior art apparatus. The basic departure from the prior art resides in the mixer head 22.

MIXER HEAD GALL TESTS

Significant data was obtained on mixer head galling. Most of the mixer heads built for the screws tested were built to the specification of flame-hardening the lands to 50-54 Rockwell C. However, one mixing head was built with Colmonoy 56 inlays on all surfaces that could contact the barrel (the entrance and exit circumferential flange and the wiping barrier).

The first time that a multi-section screw (which was built with a flame-hardened mixing head) was removed from the barrel for inspection, it was noted that a substantial amount of galling had occurred on the mixing head. In addition, later inspections of the screw continued to reveal galling on The mixing head. The galling continued despite the fact that after each of the weekly inspections the mixing head was deburred and the leading edge (as the screw rotates) was champfered to include a wedge-like geometry. The wedge-like leading edge noticeably reduced the rate at which galling on the mixing head occurred, but did not eliminate it.) Similar galling behavior was noted on all standard mixing heads. This was true regardless of the screw design (depth compression or variable lead) or the total runtime (as low as 5-6 hours).

The reduced gall mixing head (with the Colmonoy 56 but without the step bevelled section) was tested in conjunction with the five-segment, variable-lead screw during the trials held with that screw. Total runtime for this mixing head was about eight hours. Upon both visual and tactile inspection, no evidence of galling was found. The reduced-wear mixing head was completely successful.

Employed in these mixer head gall tests were 4.5" extruders of the type shown in FIG. 1, of the drawings, the prior art being uncoated and the mixer head of the invention being coated. The material processed through the extruders was 1.0 melt index, 0.918 linear, low density polyethylene. The mixer heads had 5 pairs of flutes or channels; channel lengths of 8.5 inches; mixer head diameter of 4.5 inches; wedge-producing angle of 1°; and a $\phi$ angle of 72°.

Referring specifically to FIGS. 2-5 of the drawings, it should be noted that these figures set forth only a generic representation of the class of mixer heads of the present invention. When the various parameters are selected, a specific mixer head will evolve (such as that shown in FIG. 6 of the drawings and tabulated hereinbelow).

Figure 2:
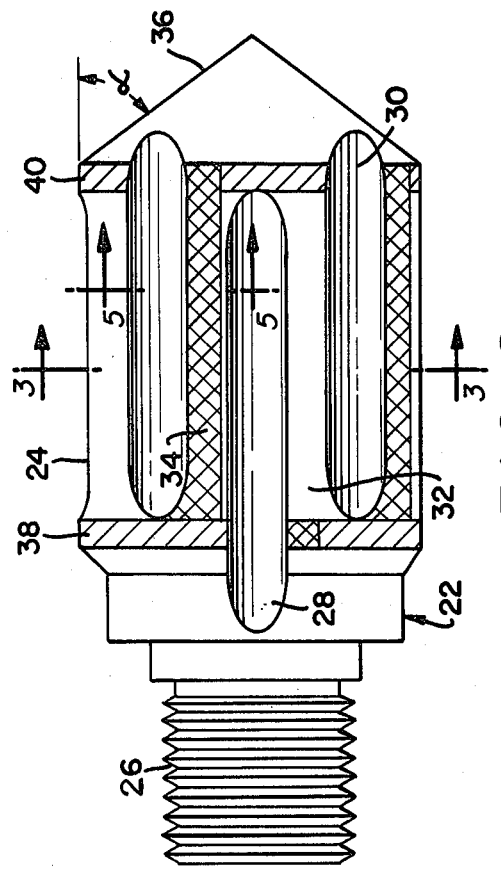
FIG. 2 is a longitudinal elevational view of a mixer head embodying the present invention.
Figure 5:
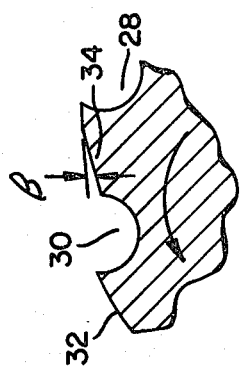
FIG. 5 is a partial cross-sectional view taken along the lines 5—5 of FIG. 2.
Figure 4:
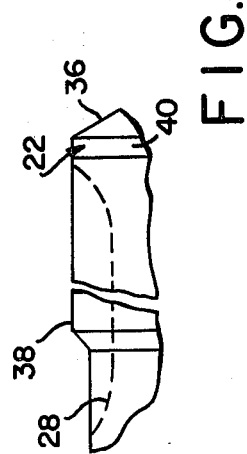
FIG. 4 is a broken, rotated, longitudinal, elevational view of the central channel of the mixer head of FIG. 2.

The mixer head is produced from 4140 steel material, is chrome plated on the surfaces which are not to be coated with gall-resistant material. Those surfaces marked with hatching in FIG. 2 are gall-resistant surfaces which receive a layer of gall-resistant material over a layer of 304 stainless steel and those with crosshatching are additionally bevelled.

The mixer head 22 comprised a body portion 24 and a shank portion 26. The incoming material entered through the inlet channels 28 and exited through the outlet channels 30. The mixing barriers are shown as 32 and the wiping barriers as element 34. The forward end of the mixer head 36 is conical in shape, being specifically determined by the selection of the angle $\alpha$. Flanges of 38 and 40 are provided at the rearward and forward ends of the mixer section of the head, respectively.

Figure 3:
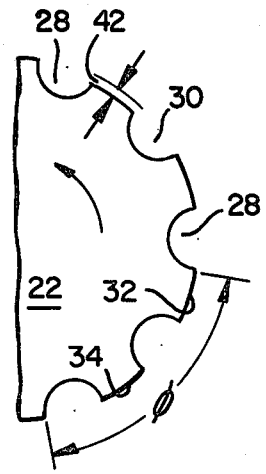
FIG. 3 is a partial sectional view, taken along the line 3—3 of FIG. 2.

As shown in FIG. 3 of the drawings, there is an undercut or clearance 42 between the outer diameter of each mixer channel and the full diameter dimension of the mixer head determined by the flanges 38 and 40 and the wiping barriers 34 and the collected spacing from the inner barrel surfaces of the extruder.

The radial clearance between said mixing barrier and the full diameter of the mixer head is determined by the equation: $C = 2D \times 10^{-3}$ inches, wherein: D is the outer diameter of the mixer head.

The angle $\beta$, the angle determining the cut back opened bevelled leading edge portion of the wiping barriers,is preferably of the order of 1°. This angle is shown in the partial view of FIG. 5 of the drawings.

It is to be noted that the singly hatched portions of the mixer head of FIG. 2 comprise the regions of full diameter of the mixer head, whereas the cross-hatched portions 34 comprise those surfaces which contribute to the formation of the hydrodynamic wedge.

Figure 6:
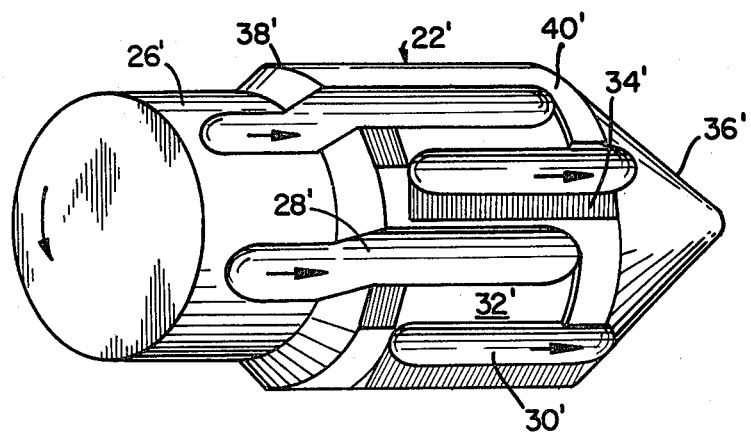
FIG. 6 is an auxiliary oblique view of a mixer head similar to that of FIG. 2.

In the showing of FIG. 6 of the drawings, elements of the mixer head as shown have been assigned primed reference numerals coresponding to similar numerals in the showing of FIGS. 2-5.

In the FIG. 6 showing, the following TABLE indicates representative values of the significant parameters.

TABLE

| | |
|---|---|
| Head Diameter | 50 mm |
| No. of channels (in plus out) | 3 pairs |
| $\phi$ Base Angle | 120° |
| Radius of channels | 9.26 mm |
| Mixing Barrier Width | 7.62 mm |

TABLE-continued

| | |
|---|---|
| Cleaning Barrier Width | 7.62 mm |
| Gap Undercut From O.D. | 0.64 mm |
| Mixing Barrier Length | 87.3 mm |
| Angle of Wedge ($\beta$) | 1° |
| Angle of Cone ($\alpha$) | 52.5° |

What is claimed is:

1. An apparatus for the mixing of linear polyolefin materials having high viscosity comprising a cylindrical extruder barrel having an inner wall, a single-screw extruder employing a mixing head within said barrel, said mixing head having mixing barriers, wiping barriers, and a plurality of longitudinal mixing channels which alternate with said mixing barriers and wiping barriers, said mixing head having outer circumferential surfaces of a diameter substantially equal to that of said inner wall of said extruder barrel, each said wiping barrier having an outer surface with an opened bevelled leading edge portion adjacent to a respective mixing channel and a longitudinal radially-stepped region on said opened bevelled leading edge portion which acts as a hydrodynamic wedge to the passage of polyolefin material passing between said outer surface and said inner wall of said extruder barrel; and both said radially-stepped, opened bevelled, leading edge portions and said outer circumferential surfaces supporting an outer coating of gall-resistant material.

2. Apparatus in accordance with claim 1, wherein said supported coating of gall-resistant material is positioned in a cross-sectionally, substantially balanced pattern around the outer circumference of said mixer head.

3. Apparatus in accordance with claim 1, wherein the leading edge portions of the outer surfaces of said wiping barriers are opened bevelled at an angle of about 1° from the outer circumference.

4. Apparatus in accordance with claim 1, wherein said radial clearance between said mixing barrier and the full diameter of the mixer head is determined by the equation: $C = 2D \times 10^{-3}$ inches, wherein: D is the outer diameter of the mixer head.

* * * * *